United States Patent [19]
Hamada et al.

[11] Patent Number: 5,418,819
[45] Date of Patent: May 23, 1995

[54] TRANSMITTING APPARATUS AND RECEIVING APPARATUS BASED ON PHASE MODULATION METHOD

[75] Inventors: Masatoshi Hamada; Nobuhiko Kawai; Makoto Ishii; Hirokazu Toyota, all of Tokyo, Japan

[73] Assignee: Nippon Hoso Kyokai, Tokyo, Japan

[21] Appl. No.: 94,031

[22] PCT Filed: Nov. 6, 1992

[86] PCT No.: PCT/JP92/01445
§ 371 Date: Jul. 14, 1993
§ 102(e) Date: Jul. 14, 1993

[87] PCT Pub. No.: WO93/10612
PCT Pub. Date: May 27, 1993

[30] Foreign Application Priority Data
Nov. 18, 1991 [JP] Japan .................. 3-301883

[51] Int. Cl.⁶ .................................. H04L 27/18
[52] U.S. Cl. ........................ 375/279; 375/280; 375/308; 375/329; 375/332
[58] Field of Search .................... 375/67, 52, 53, 83, 375/86, 54, 44, 78, 39; 332/103; 329/304

[56] References Cited
U.S. PATENT DOCUMENTS

| | | | |
|---|---|---|---|
| 4,008,373 | 2/1977 | Nash et al. ............... | 375/53 |
| 4,281,412 | 7/1981 | Wissel et al. ............. | 375/86 |
| 4,613,976 | 9/1986 | Sewerinson et al. ...... | 375/52 |
| 4,807,252 | 2/1989 | Ikegami et al. ........... | 375/53 |
| 5,140,613 | 8/1992 | Birgenheier et al. ...... | 375/67 |

FOREIGN PATENT DOCUMENTS

| | | |
|---|---|---|
| 55-25523A | 2/1980 | Japan . |
| 56-990 | 1/1981 | Japan . |
| 56-47153 | 4/1981 | Japan . |
| 57-159157A | 10/1982 | Japan . |
| 159157 | 10/1982 | Japan . |
| 58-34658 | 3/1983 | Japan . |
| 61-49865 | 10/1986 | Japan . |
| 63-4666 | 7/1988 | Japan . |

OTHER PUBLICATIONS

IEEE Transactions on Communications, vol. 35, No. 3, Mar. 1987, pp. 349–352 "DCTPSK–Differentially Detected Controlled Transition PSK", A. Youngacoglu/K. Feher.

Primary Examiner—Stephen Chin
Assistant Examiner—Tesfaldet Bocure
Attorney, Agent, or Firm—Spencer, Frank & Schneider

[57] ABSTRACT

A transmitting apparatus based on phase modulation including a data encoding circuit (100), a phase locus control circuit (200) and a modulator (300). The data encoding circuit (100) divides input data to be transmitted into a predetermined number of bits, and sequentially outputs them as segmented data. The phase locus control circuit (200) outputs a phase locus control signal representing each of the segmented data by three values of a positive direction, a negative direction and a non-rotation state of the phase rotation. The modulator (300) changes the phase of a transmission signal in response to the phase locus control signal. Using the phase rotation direction information of the three values makes it possible to reduce transmission bits, to increase transmission speed and transmission capacity.

20 Claims, 15 Drawing Sheets

MSK MODULATOR

FIG. 10B

| $D_A (\phi_k, q_k)$ / $D_B (\phi_{k+1}, q_{k+1})$ | $(\pi, +)$ | $(O, O)$ | $(\pi, -)$ |
|---|---|---|---|
| $(O, +)$ | $d_9$ | $d_{10}$ | $d_{11}$ |
| $(O, O)$ | $d_{12}$ | $dx2$ | $d_{13}$ |
| $(O, -)$ | $d_{14}$ | $d_{15}$ | $d_{16}$ |

FIG. 10A

| $D_A (\phi_k, q_k)$ / $D_B (\phi_{k+1}, q_{k+1})$ | $(O, +)$ | $(\pi, O)$ | $(O, -)$ |
|---|---|---|---|
| $(\pi, +)$ | $d_1$ | $d_2$ | $d_3$ |
| $(\pi, O)$ | $d_4$ | $dx1$ | $d_5$ |
| $(\pi, -)$ | $d_6$ | $d_7$ | $d_8$ |

| $D_B$ \ $D_A$ | | $q_k$ | + | | O | | − | |
|---|---|---|---|---|---|---|---|---|
| | $\phi_k$ / $\phi_{k+1}$ | | O | π | O | π | O | π |
| $q_{k+1}$ | | | | | | | | |
| + | O | | $d_{11}$ | $d_{12}$ | $d_{13}$ | $d_{14}$ | $d_{15}$ | $d_{16}$ |
| + | π | | $d_{21}$ | | | | | ⋮ |
| O | O | | $d_{31}$ | | | | | ⋮ |
| O | π | | $d_{41}$ | | | | | ⋮ |
| − | O | | $d_{51}$ | | | | | ⋮ |
| − | π | | $d_{61}$ | --- | --- | --- | --- | $d_{66}$ |

FIG.11

|  | $D_A$ | | |
|---|---|---|---|
| $q_k$ \ $q_{k+1}$ | + | 0 | − |
| + (D_A) | $d_1$ | $d_2$ | $d_3$ |
| 0 (D_A) | $d_4$ | $d_5$ | $d_6$ |
| − | $d_7$ | $d_8$ | $d_9$ |

FIG. 13

|  | $D_A$ | | | |
|---|---|---|---|---|
| $\theta_k$ \ $\theta_{k+1}$ | $\theta_1$ | $\theta_2$ | ----- | $\theta_n$ |
| $\theta_1$ | $d_{11}$ | $d_{12}$ | ----- | $d_{1n}$ |
| $\theta_2$ ($D_B$) | $d_{21}$ | $d_{22}$ | ----- | $d_{2n}$ |
| ⋮ | ⋮ | ⋮ | ----- | ⋮ |
| $\theta_n$ | $d_{n1}$ | $d_{n2}$ | ----- | $d_{nn}$ |

$\theta = q_k \cdot p_k \cdot \omega_k$     for $q = +$ or $q = −$

FIG. 14

| $D_B$ | | $D_A$ | | | | | | | |
|---|---|---|---|---|---|---|---|---|---|
| | | $\theta_k$ | $\theta_1$ | ---- | | $\theta_n$ | | | |
| | $\theta_{k+1}$ | $\phi_k$ / $\phi_{k+1}$ | $\phi_1$ | --- | $\phi_n$ | ---- | $\phi_1$ | --- | $\phi_n$ |
| $\theta_1$ | $\phi_1$ | | $d_{1,1}$ | --- | $d_{1,n}$ | | | | $d_{1,nn}$ |
| | ⋮ | | | | | | | | |
| | $\phi_n$ | | | | | | | | |
| ⋮ | ⋮ | | | | | | | | |
| $\theta_n$ | $\phi_1$ | | | | | | | | |
| | ⋮ | | | | | | | | |
| | $\phi_n$ | | $d_{nn,1}$ | | | | | | $d_{nn,nn}$ |

$\theta = q_k \cdot p_k \cdot \omega_r$      for $q = +$ or $q = -$

FIG. 15

TRANSMITTING APPARATUS AND RECEIVING APPARATUS BASED ON PHASE MODULATION METHOD

TECHNICAL FIELD

The present invention relates to a transmitting apparatus and a receiving apparatus based on a new phase modulation method obtained by improving a PSK (Phase Shift Keying) method or an MSK (Minimum Shift Keying) method.

BACKGROUND ART

FIG. 1 shows a diagrammatical structure of a modulator using a quadrature phase shift keying (QPSK) method known in the art. A transmission signal supplied as base band data is decomposed into single bits $i_k$ and $q_k$ alternately by a distributor 2, and is inputted to balanced modulators 8 and 10 through roll-off filters 4 and 6, respectively. A binary phase shift keying (BPSK) signal is obtained at each output of the balanced modulators 8 and 10. The phase of the carrier wave generated by a carrier wave generator 12 is shifted by 90 degrees by a phase shifter 14, and hence the phases of the two carrier waves differ by 90 degrees. Therefore, a quadrature PSK signal is obtained by composing vectors of the two BPSK signals by an adder 16, and then by removing unnecessary frequency components by a band-pass filter 18.

The modulated signal by QPSK is expressed by the following equation.

$$S(t) = (i_k \cos\omega_c t + q_k \sin\omega_c t)/\sqrt{2} \tag{1}$$

In this case, a modulated signal by BPSK is obtained at the output of either the balanced modulator 8 or 10 shown in FIG. 1, and is expressed by the following equation.

$$S(t) = i_k \cos\omega_c t \tag{1A}$$

FIG. 2 shows phase changes in QPSK. Let us consider the case where the phase of the signal changes from the signal point $P_1$ to $P_2$ (a phase rotation amount is 180 degrees), or from the signal point $P_1$ to $P_4$ (a phase rotation amount is 90 degrees). In an ideal case where these phase changes occur in zero time, the phase locus passes along the I-axis or the Q-axis, and the envelope of the QPSK signal is maintained constant. Actual phase changes, however, take finite times, and the phase loci are apart from the I-axis and Q-axis, thereby resulting in dips as shown in FIG. 3. For example, when the phase rotation amount is 180 degrees, the amplitude dips to approximately zero because the phase change locus passes through the neighborhood of the zero point, and dips 3 dB when a 90 degree change occurs.

Thus, since the phase loci define a curve apart from the I-axis and Q-axis, finite times are required for the phase changes, and the level of the envelope changes at phase transition points.

The level changes which occur at these phase transitional points (1) are not involved in information transmission, and (2) widen transmission bandwidth due to the level changes, and are considered as drawbacks.

MSK as shown in FIG. 4 is known as another technique similar to PSK. The modulated signal by MSK is expressed by the following equation.

$$S(t) = [i_k \cos\omega_p t]\cos\omega_c t + [q_k \sin\omega_p t]\sin\omega_c t \tag{2}$$

This shows that MSK is equivalent to using half-period sinusoidal waves, whose phases differ by 90 degrees from each other, instead of square pulses of the input signal used in the QPSK modulation circuit shown in FIG. 1. MSK is characterized in that it has little degradation in characteristics such as phase distortion even in a nonlinear transmission line having a saturation characteristic, because MSK includes no discontinuous transitions of the carrier waves and has an envelope of a constant amplitude.

The phase of MSK defines a spatial locus that rotates clockwise or counterclockwise in accordance with "0" or "1" in the transmission data. In other words, MSK transmits information using positive and negative rotational directions. MSK, however, does not use the non-rotational state as information.

SUMMARY OF THE INVENTION

It is therefore an object of the present invention to provide a transmitting apparatus and a receiving apparatus based on a new phase modulation method which makes it possible to provide an efficient data transmission by positively utilizing level changes at phase transitional points during phase modulation.

Another object of the present invention is to improve the data transmission efficiency by positively utilizing the non-rotational state of the phase locus in addition to the positive and negative rotational directions of the locus.

According to a first aspect of the present invention, there is provided a transmitting apparatus based on phase modulation, comprising:

data conversion means for dividing input data to be transmitted into every predetermined number of bits, for sequentially outputting the predetermined number of bits as segmented data and generating ternary phase rotation information;

phase locus control means for outputting a phase locus control signal that represents each of the segmented data by using the ternary phase rotation information generated by the data conversion means corresponding to a positive direction, a negative direction and a non-rotation state of phase rotation directions; and modulation means for modulating the phase of a carrier signal with the phase locus control signal thereby obtaining a transmission signal.

Here, the phase locus control means may output the phase locus control signal representing the segmented data by the ternary phase rotation information associated with the direction of the phase rotation, and by a phase at which the phase rotation starts.

According to a second aspect of the present invention, there is provided a receiving apparatus based on phase modulation, which receives a phase modulation signal formed by changing the phase of a signal in accordance with a phase locus control signal which is formed by dividing input data to be transmitted into segmented data of a predetermined number of bits, and by representing each of the segmented data sequentially by ternary phase rotation information which corresponds to a positive direction, a negative direction and a non-rotation state of phase rotation directions, the receiving apparatus comprising:

a phase detector detecting the phase modulation signal;

phase locus demodulation means for demodulating the phase locus control signal from an output of the phase detector; and decoding means for decoding the phase rotation signal into the segmented data in response to the phase locus demodulation means.

According to a third aspect of the present invention, there is provided a transmitting and receiving apparatus based on phase modulation, comprising:

data conversion means for dividing input data to be transmitted into every predetermined number of bits, and for sequentially outputting the predetermined number of bits as segmented data and generating ternary phase rotation information associated therewith;

phase locus control means for outputting a phase locus control signal that represents each of the segmented data by using the ternary phase rotation information generated by the data conversion means corresponding to a positive direction, a negative direction and a non-rotation state of phase rotation directions;

modulation means for modulating the phase of a carrier signal with the phase locus control signal thereby obtaining a transmission signal;

a phase detector detecting the transmission signal;

phase locus demodulation means for demodulating the phase locus control signal from an output of the phase detector; and decoding means for decoding the phase rotation signal into the segmented data in response to the phase locus demodulation means.

The present invention utilizes the non-rotational state in addition to the positive and negative rotational directions that the spatial phase locus draws, and defines these as ternary rotational direction information, thereby using the fact that the transmission of n-pieces of the ternary rotational direction information corresponds to transmitting a $3^n$-bit signal. Furthermore, combining the rotational direction information with the rotation start phases can further improve the transmission rate. Moreover, changing the spatial phase locus can also improve the transmission rate.

BRIEF DESCRIPTION OF THE DRAWINGS

FIGS. 10A and 10B are tables showing relationships between phase rotation states and segmented data in the first embodiment;

FIG. 11 is a table showing relationships between phase rotation states and segmented data under the condition that the phase rotation directions and phase rotation starting positions are independently determined without any physical constraint in FIGS. 10A and 10B;

FIG. 13 is a table showing relationships between phase rotation states and segmented data in the second embodiment;

FIG. 14 is a table showing relationships between phase rotation amounts and segmented data under the condition that the phase rotation direction is positive or negative in a third embodiment of a transmitting apparatus and a receiving apparatus based on the phase modulation method in accordance with the present invention;

FIG. 15 is a table showing relationships between phase rotation amounts, absolute values of phase rotation starting positions, and segmented data under the condition that the phase rotation direction is positive or negative, and the phase rotation directions and phase rotation starting positions are independently determined without any physical constraint in a fourth embodiment of a transmitting apparatus and a receiving apparatus based on the phase modulation method in accordance with the present invention.

DETAILED DESCRIPTION OF THE PREFERRED EMBODIMENTS

The invention will now be described with reference to the accompanying drawings.

EMBODIMENT 1

Figure 9A:
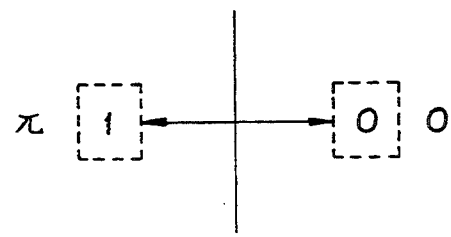
FIG. 9A is a diagram illustrating a conventional BPSK.
Figure 9B:
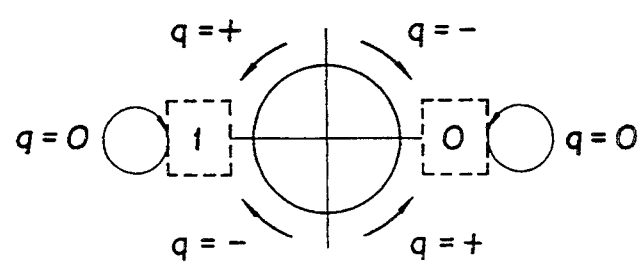
FIG. 9B is a diagram illustrating the basic principle of the BPSK (modified BPSK) in accordance with the present invention.

This embodiment uses serial data as input data to be transmitted, and BPSK as a phase modulator. FIGS. 9A and 9B are schematic diagrams illustrating the difference between conventional BPSK and BPSK (called modified BPSK hereinafter) in accordance with the present embodiment. Although in the prior art, the phases are switched between 0 and $\pi$, the present invention employs a three value system by adding information of non-rotation to the phase rotation directions of + and −. More specifically, the embodiment takes account of the fact that it takes a certain time period for phase changes to occur, and controls phase change loci by intentionally utilizing the time period to generate the three values, thereby improving the information transmission speed.

Figure 5:
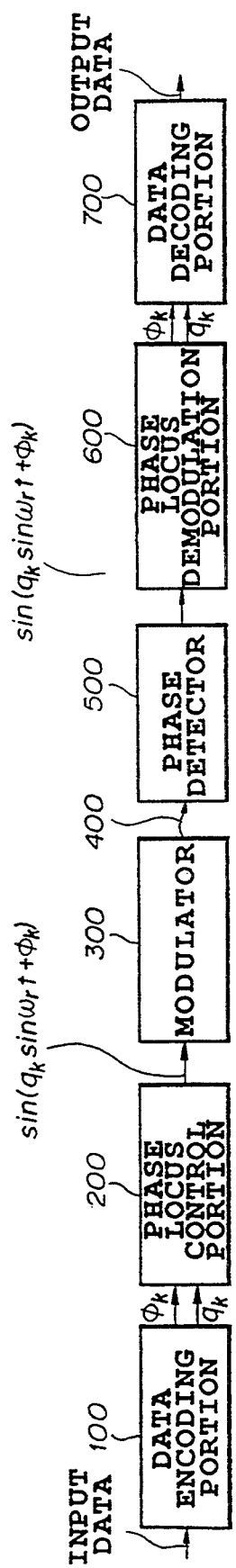
FIG. 5 is a block diagram showing the entire arrangement of a first embodiment of a transmitting apparatus and a receiving apparatus based on the phase modulation method in accordance with the present invention.

FIG. 5 is a block diagram showing the entire arrangement of a first embodiment of a transmitting apparatus and a receiving apparatus based on the phase modulation method in accordance with the present invention.

In FIG. 5, the reference numeral 100 denotes a data encoding portion. The data encoding portion 100 divides the serial input data into segments every 4 bits, to prepare segmented data $d_1$–$d_{16}$ as shown in FIGS. 10A and 10B. For example, $d_1$ is 0000, $d_2$ is 0001, ..., and $d_{16}$ is 1111. The segmented data $d_1$–$d_{16}$ are represented by a combination ($\phi_k$, $q_k$) of binary data $\phi_k$ and ternary data $q_k$. Here, the binary data $\phi_k$ ($=0, \pi$) designates the starting position of the phase rotation shown in FIGS. 10A and 10B, where $\phi_k=0$ when the starting position is 0, and $\phi_k=\pi$ when the starting position is $\pi$. On the other hand, the ternary data $q_k$ ($=+, 0, -$) takes + (or +1) when the phase rotation direction is positive (counterclockwise), 0 when the phase does not rotate, and − (or −1) when the phase rotation direction is negative. Each segmented data is represented by two data (phase data) $D_A$ ($=\phi_k, q_k$) and $D_B$ ($=\phi_{k+1}, q_{k+1}$). For example, the segmented data $d_1$ is represented as (0, +) and ($\pi$, +) because it is specified by a positive rotation from 0 followed by a positive rotation from $\pi$. Likewise, the segmented data $d_7$ is represented as ($\pi$, 0) and ($\pi$, 31 ). The data $d_{x1}$ and $d_{x2}$ will be described later.

The phase data ($\phi_k$, $q_k$) outputted from the data encoding portion 100 are supplied to a phase locus control portion 200, and are converted into a sinusoidal wave including information on the rotation direction and rotation starting position. Specifically, the phase locus control portion 200 converts the phase data ($\phi_k$, $q_k$) into a phase locus control signal represented by the following expression, and outputs the signal.

$$\sin(q_k \sin\omega_r t + \phi_k) \qquad (3)$$

where $\omega_r$ is the angular velocity of the phase rotation. Here, the present invention is characterized in that the rotation direction information $q_k$ takes three values of (+, 0, −).

Figure 1:
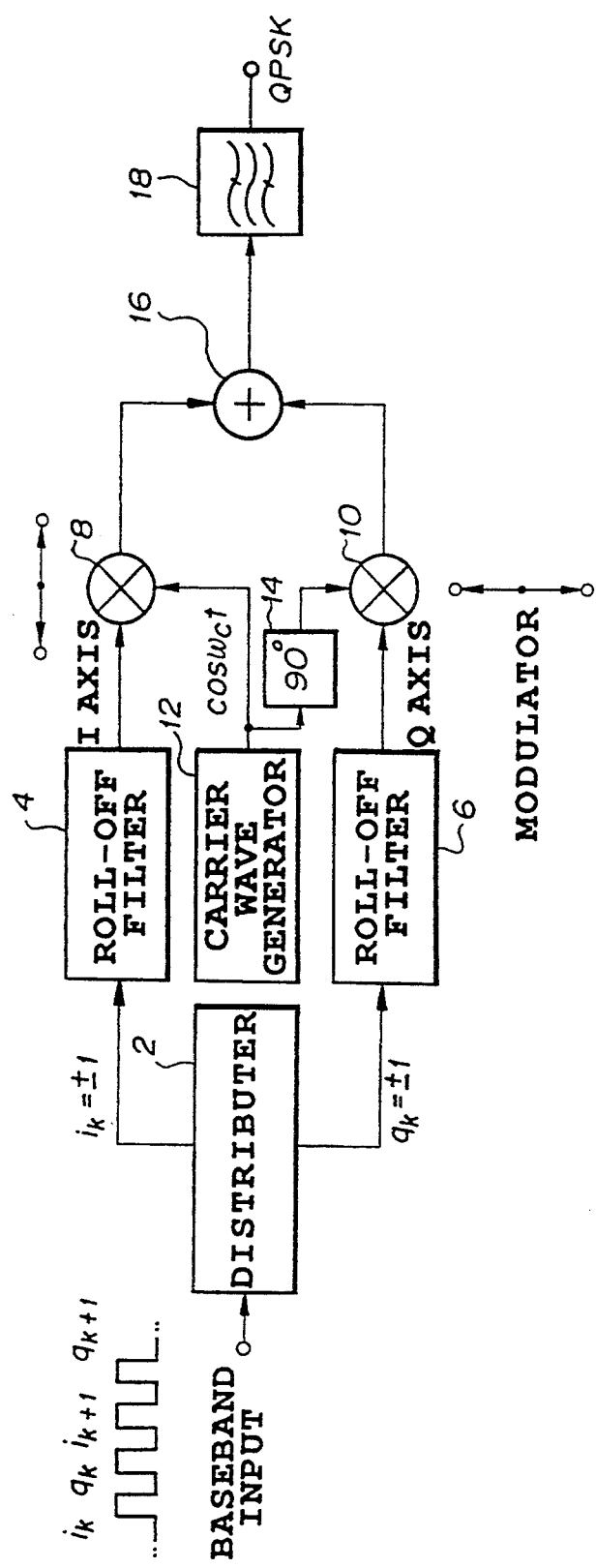
FIG. 1 is a block diagram showing the arrangement of a conventional quadrature PSK (QPSK) modulator.

The phase locus control signal outputted from the phase locus control portion 200 is phase modulated into a modified BPSK signal by a modulator 300. The modulator 300 is the same as the conventional balanced modulator as shown in FIG. 1. The above is the construction of the transmitting apparatus. The modified BPSK generated by the transmitting apparatus is transmitted to a receiving end via a wire or wireless transmission line 400.

The receiving apparatus is constructed as follows:

The signal transmitted through the transmission line 400 is phase detected by a phase detector 500. The phase detector 500 is the same as a conventional phase detector. This phase detection produces the phase locus control signal given by expression (3), which is supplied to a phase locus demodulation portion 600.

The phase locus demodulation portion 600 demodulates $q_k\omega r$ and $\phi_k$ from the phase locus control signal inputted thereto, and supplies them to a data decoding portion 700. The data decoding portion 700 obtains the phase data ($\phi_k$, $q_k$) from the signals $q_k\omega_r$ and $\phi_k$, decodes them into the segmented data $d_1$–$d_{16}$, and outputs them.

Figure 6:
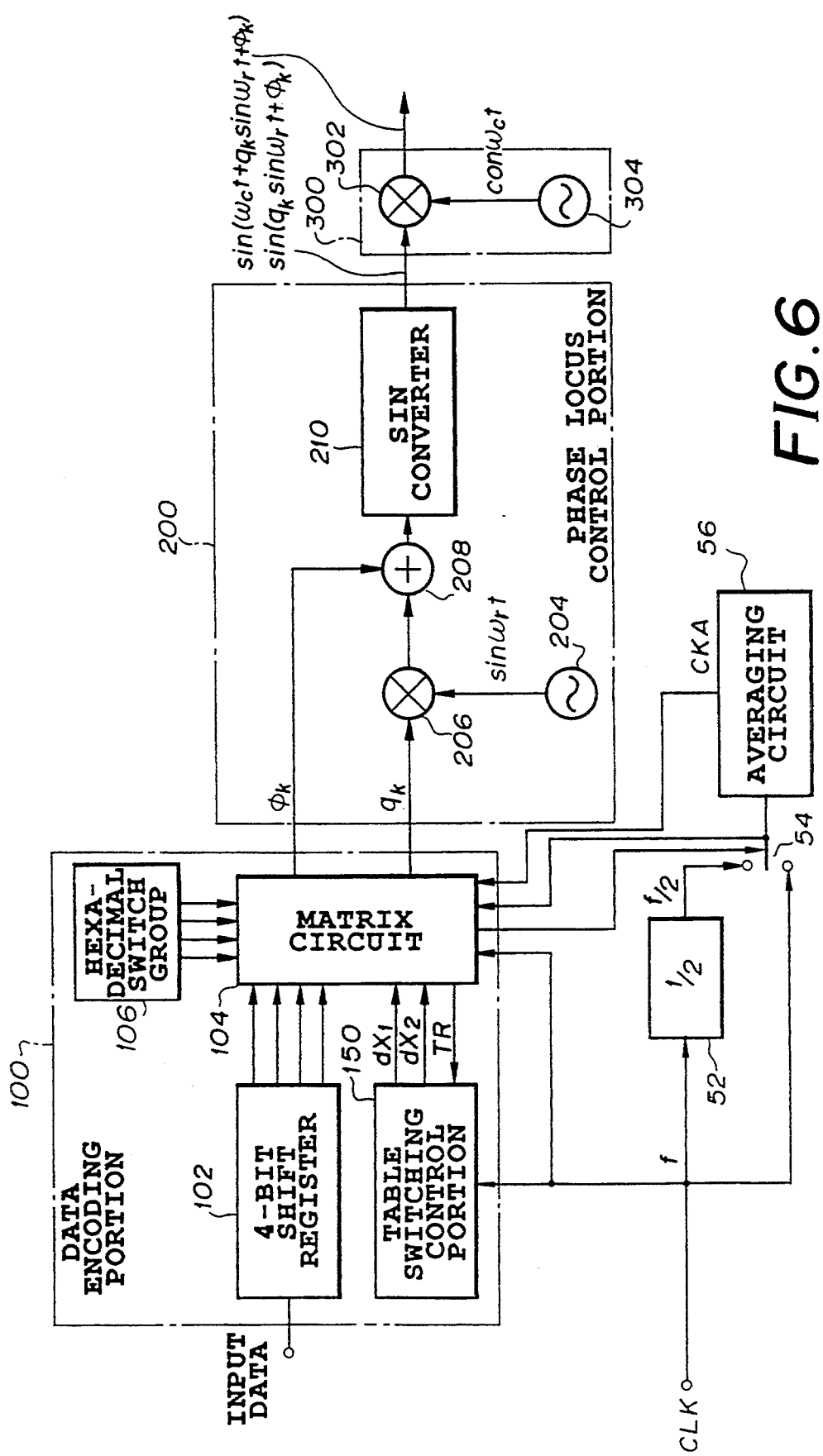
FIG. 6 is a block diagram showing the arrangement of a transmitting apparatus shown in FIG. 5.

FIG. 6 is a block diagram showing a detailed arrangement of transmitting apparatus shown in FIG. 5. The data encoding portion 100 includes a 4-bit shift register 102 which divides the input data into segments every four bits to generate the segmented data $d_1$–$d_{16}$ shown in FIGS. 10A and 10B, a matrix circuit 104 for converting the segmented data $d_1$–$d_{16}$ into consecutive two phase data $D_A$ and $D_B$, a hexadecimal switch group 106 which outputs 16 (4-bit) reference values, and a table switching control portion 150 which will be described later.

Figure 7:
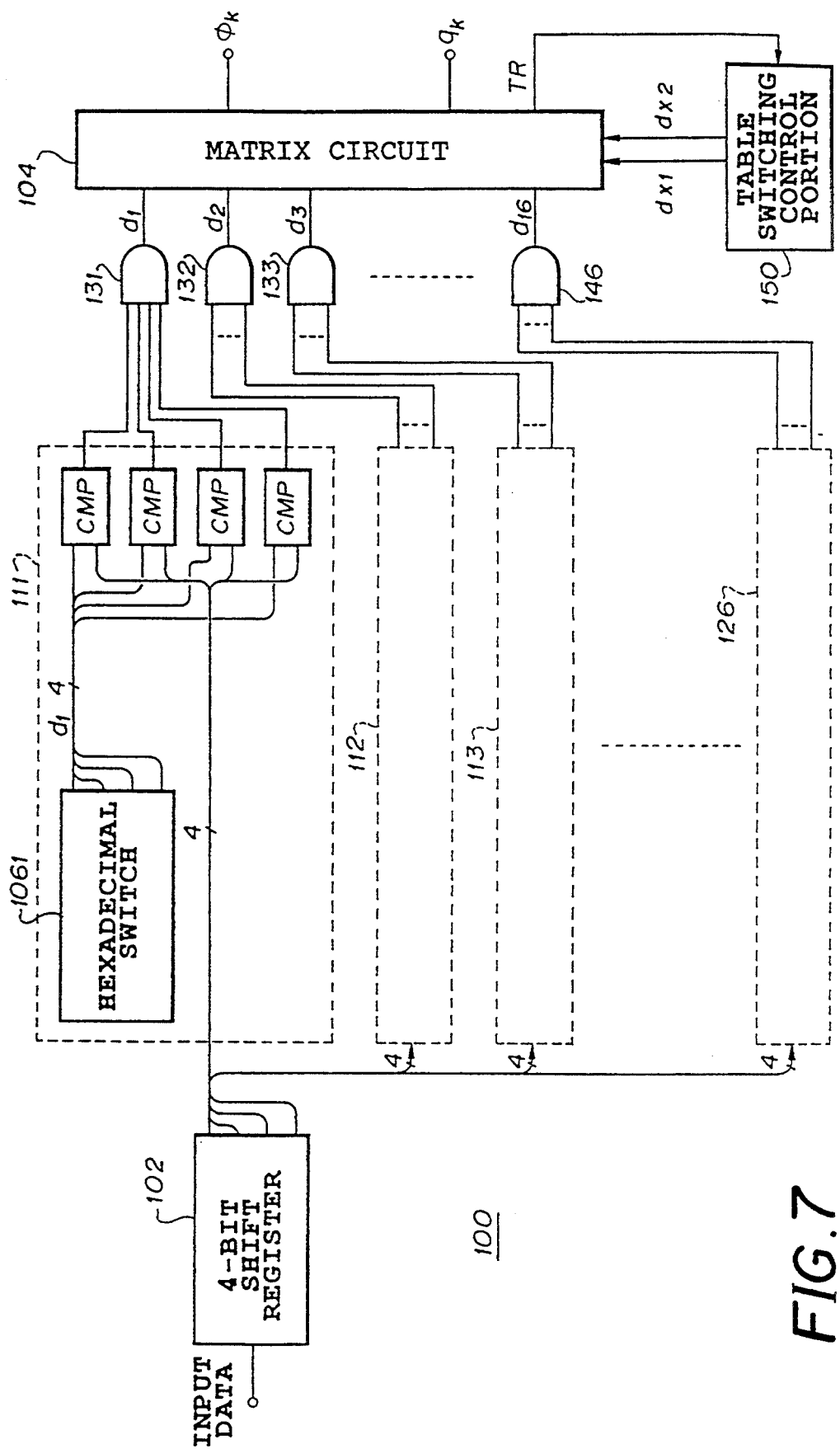
FIG. 7 is a block diagram showing the arrangement of the data encoding portion shown in FIG. 6.

FIG. 7 is a block diagram showing a more detailed construction of the data encoder 100. The parallel 4-bit data outputted from the 4-bit shift register 102 are supplied to 16 data comparing portions 111-126. Each of the data comparing portions 111-126 outputs a signal (1111) when the segmented data associated with that data comparing portion is inputted. For example, the data comparing portion 111 outputs a 4-bit signal (1111) when the segmented data $d_1$ (0000) is inputted, and the data comparing portion 112 outputs a 4-bit signal (1111) when the segmented data $d_2$ (0001) is inputted. For this purpose, each data comparing portion is provided with a hexadecimal switch 106m (m is one of 1-16), and four comparators CMP. The hexadecimal switches produce reference values for determining the segmented data $d_1$–$d_{16}$. For example, the hexadecimal switch 1061 in the data comparing portion 111 outputs the value (0000) corresponding to $d_1$, and the hexadecimal switch in the data comparing portion 112 outputs the value (0001) corresponding to $d_2$. Each comparator CMP compares the corresponding bits from the hexadecimal switch and the shift register 102, and outputs 1 if they agree, and 0 if disagree. The 4-bit outputs from the comparing portions 111-126 are supplied to 4-input AND gates 131-146, respectively. Thus, the AND gate 131 outputs 1 only when the input data is $d_1$, and the AND gate 132 outputs 1 only when the input data is $d_2$. The remaining AND gates operate in a similar manner. For example, the AND gate 146 outputs 1 only when the input data is $d_{16}$.

Figure 7A:
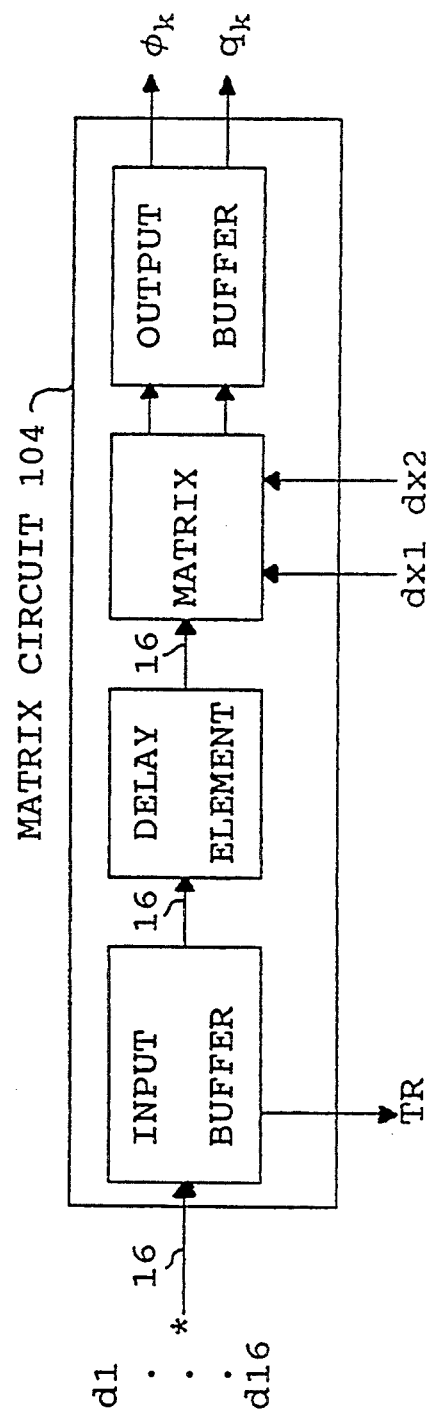
FIG. 7A shows the details of the matrix switch of FIG. 7.

The segmented data $d_1$–$d_{16}$ are supplied to the matrix circuit 104. The matrix circuit 104 has an ordinary matrix for the data conversion, and converts the segmented data $d_1$–$d_{16}$ and the table switching data $d_{x1}$ and $d_{x2}$ into phase data $D_A$ and $D_B$ as shown in FIGS. 10A and 10B. The matrix circuit 104 further comprises an input buffer for storing the input data fed from the AND gates 131-146, a delay element for delaying a signal by a two-clock interval, an output buffer for storing the phase data $D_A$ and $D_B$, and a table switching detecting circuit for detecting the table switching as shown in FIG. 7A.

Referring to FIGS. 10A and 10B, the table switching will be described. As described above, the segmented data $d_1$–$d_{16}$ are each represented by a pair of phase data $D_A$ ($=\phi_k, q_k$) and $D_B$ ($=\phi_{k+1}, q_{k+1}$). In this case, if the $\phi_k$ and $q_k$ are completely independent of each other, the phase data can take six values as shown in FIG. 11 because each value of the binary data $\phi_k$ can take three values determined by the ternary data $q_k$. Therefore, a pair of ($\phi_k$, $q_k$) can designates 36 ($=6\times6$) segmented data. In general, however, the data $\phi_k$ and $q_k$ are not independent of each other. Consider the segmented data $d_1$, for example. When the phase locus starts to rotate from the rotation starting position of 0 in the direction of +, it is constrained to start next from the rotation starting point of $\pi$. In other words, the data $\phi_k$ of the second data ($\phi_{k+1}$, $q_{k+1}$) cannot take 0. Considering such physical constraint, a pair of phase data $D_A$ and $D_B$ can designate only 18 segmented data as shown in FIGS. 10A and 10B. In addition, the two tables shown in these figures must be switched. For example, when the data $d_1$ and $d_{16}$ are successively transmitted, the table switching data $d_{x1}$ is interposed between the two data.

For this purpose, a table switching control portion 150 is connected to the matrix circuit 104 in order to control the transmission of the table switching data $d_{x1}$ and $d_{x2}$. For example, in the case where the segmented data $d_1$ and $d_{16}$ are transmitted successively, since the table switching data $d_{x1}$ must be interposed between the two data, the matrix circuit 104 must output the phase data corresponding to three data $d_1$, $d_{x1}$ and $d_{16}$ for the two segmented data $d_1$ and $d_{16}$. To realize this, the matrix circuit 104 detects that a table switching occurs when the data $d_1$ and $d_{16}$ are inputted consecutively, and sends a switching command TR to the table switching control portion 150, while storing the data $d_{16}$ in the input buffer. Then, the table switching circuit 150 provides the matrix circuit 104 with a command to output the switching data $d_{x1}$. The matrix circuit 104 outputs the phase data corresponding to the switching data $d_{x1}$, and then outputs the phase data corresponding to the data $d_{16}$. The 2-clock delay element mentioned above is used to provide the data $d_{16}$ with the delay. During this operation, the matrix circuit 104 connects a switch 54 shown in FIG. 6 directly to the clock, so that the interval of the clock pulses supplied to the matrix circuit 104 and an averaging circuit 56 is doubled. The averaging circuit 56 will be described later.

The phase locus control portion 200 (FIG. 6) is arranged as follows: First, the binary data (rotation starting phase) $\phi_k$, which indicates whether the rotation starting position is 0 or $\pi$, is inputted to an adder 208. On the other hand, the ternary data $q_k$ (+, 0, −) indicating the directions of rotation (including the non-rotation state) is supplied to a multiplier 206 which multiplies it by a sine wave $\sin\omega_r t$ supplied from a sine wave generator 204. Specifically, $$q_k \sin\omega_r t \quad (4)$$

is obtained, where $\omega_r$ is the angular velocity of the phase rotation.

The output of the multiplier 206 is applied to an adder 208, and the addition represented by the following expression is performed.

$$q_k \sin\omega_r t + \phi_k \quad (5)$$

The output of the adder 208 is supplied to a sine converter 210, which outputs the phase locus control signal expressed by expression (3). In other words, the phase locus control portion 200 output the sinusoidal phase locus control signal including the ternary data $q_k$ indicating the direction of the phase rotation and the binary data $\phi_k$ indicating the phase rotation starting position. The phase locus control signal is phase modulated by a binary phase modulator 300 having a balanced modulator 302 and a carrier wave generator 304. Thus, the modified BPSK signal represented by the following expression is outputted.

$$\sin(\omega_c t + q_k \sin\omega_r t + \phi_k) \quad (6)$$

In order to transmit a single (4-bit) segmented data, two phase data $D_A$ and $D_B$ must be transmitted by carrying out the phase rotation twice. Performing such double phase rotations corresponds to transmitting 2-bit data from the BPSK modulator 300. Accordingly, each of the serial 4-bit input data $d_{1}$ $_1$-$d_{16}$ (including the data $d_{x1}$ and $d_{x2}$ which are utilized as the table switching data in this embodiment) is transmitted in the form of 2-bit data on the transmission line 400. In other words, the 4-bit data can be transmitted as 2-bit data by representing the directions of rotation by the ternary data $q_k$ including the non-rotation state in addition to the positive and negative directions, and by adding the rotation starting position information $\phi_k$. The transmission speed, however, is not necessarily doubled, which will be discussed later.

Corresponding to the above, the frequency f of the clock CLK is divided into f/2 by the frequency divider 52 as shown in FIG. 6. More specifically, four clock pulses are needed to enter a single (4-bit) segmented data into the shift register, while it is enough for the matrix circuit 104 to output the two phase data $D_A$ and $D_B$ during that interval. Thus, the clock frequency is divided by 2 so that each phase data is outputted for every two clock pulses. The clock whose frequency is f/2 is supplied to the matrix circuit 104 and the averaging circuit 56 via the switch 54.

However, when the table switching data $d_{x1}$ or $d_{x2}$ is transmitted, it is transmitted in conjunction with one of the segmented data $d_1$-$d_{16}$ during four clock pulse intervals, and hence single effective data is substantially transmitted by four clock pulses. In this case, the switch 54 is connected directly to the clock CLK so that the clock whose frequency is f is supplied to the matrix circuit 104 and the averaging circuit 56. The signal that controls this switching is supplied from the matrix circuit 104 to the switch 54 as mentioned above.

The averaging circuit 56 computes the average time necessary for transmitting single data from a predetermined number (for example, 10 pieces) of data. When nine effective data out of the segmented data $d_1$-$d_{16}$ and one table switching data $d_{x1}$ are contained in the 10 data, 11×2 clock pulse intervals are required. That is, the average interval is 2.2 clock intervals. Accordingly, the reading of the phase data $\phi_k$ and $q_k$ from the matrix circuit 104 should be carried out every 2.2 clock intervals. The signal CKA supplied from the averaging circuit 56 to the matrix circuit 104 is a clock signal which has been averaged in such a manner. Such averaging presents an advantage in that the transmission speed is also averaged.

Figure 8:
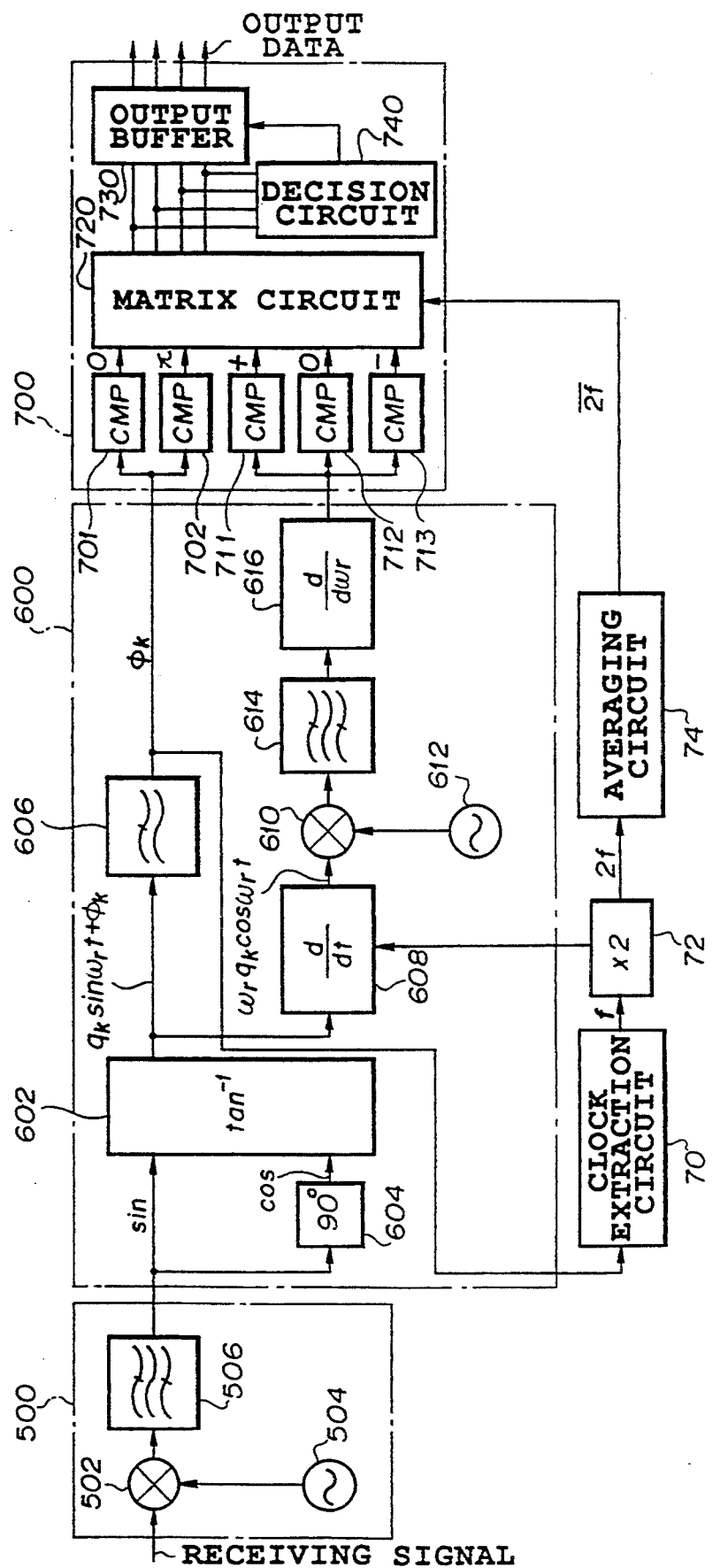
FIG. 8 is a block diagram showing the arrangement of the receiving apparatus shown in FIG. 5.

Next, detailed structure of the receiving apparatus will be described with reference to FIG 8. The receiving apparatus demodulates the received signal to decode the data by the operation basically opposite to that of the transmitting apparatus.

The signal received via the transmission line 400, which is a modified BPSK signal represented by expression (6), is inputted to a synchronous detector 502 in the phase detector 500. The synchronous detector 502 multiplies the received signal by the carrier wave reproduced by a carrier reproducing portion 504, and supplies the product to a band-pass filter 506. As a result, the band-pass filter outputs the phase locus control signal represented by expression (3).

The phase locus control signal is supplied to an arc tangent circuit 602 in the phase locus demodulation portion 600 and to a phase shifter 604. The phase shifter 604 rotates the phase of the phase locus control signal by 90 degrees, and supplies it to the arc tangent circuit 602 as a cosine wave. Thus, the arc tangent circuit 602 receives the phase locus control signal represented by expression (3) and the cosine wave corresponding thereto, calculates the arc tangent of the ratio of the two input signals (i. e, tangent) , and outputs the arc tangent or the reciprocal of the tangent. As a result, the arc tangent circuit 602 produces the output represented by expression (5), from which the rotation starting phase $\phi_k$ and the rotation direction information $q_k$ are demodulated as follows:

First, the sum represented by expression (5) is passed through a low-pass filter 606, which outputs the rotation starting phase $\phi_k$. The sum represented by expression (5) is also supplied to a differentiator 608 which differentiates the sum, and outputs a cosine wave whose amplitude is $\omega_r q_k$. That is, the differentiator outputs the following:

$$\omega_r q_k \cos \omega_r t \quad (7)$$

The cosine wave is further supplied to a multiplier 610 which multiplies the cosine wave by a cosine wave $\cos \omega_r t$ supplied from an oscillator 612, and supplies the product to a band-pass filter 614. The band-pass filter 614 outputs the amplitude $\omega_r q_k$ which is inputted to a differentiator 616. The differentiator 616 differentiates the input by $\omega_r$, and outputs the rotation direction information $q_k$.

Thus, the phase locus demodulation portion 600 outputs the rotation starting phase $\phi_k$ and the rotation direction information $q_k$, and supplies them to the data decoding portion 700.

The data decoding portion 700 restores the segmented data $d_1$–$d_{16}$ from the two phase data $D_A = (\phi_k, q_k)$ and $D_B = (\phi_{k+1}, q_{k+1})$. First, the binary data $\phi_k$ is supplied to two comparators 701 and 702, and is compared with 0 and $\pi$, respectively. The comparator 701 outputs 1 when the binary data $\phi_k$ is 0, and the comparator 702 outputs 1 when $\phi_k$ is $\pi$. On the other hand, the ternary data $q_k$ is supplied to comparators 711, 712 and 713, and is compared with +,0 and −, respectively. The comparator 711 outputs 1 when $q_k$ is +, the comparator 712 outputs 1 when $q_k$ is 0, and the comparator 713 outputs 1 when $q_k$ is −. The outputs of these five comparators are supplied to a matrix circuit 720.

The matrix circuit 720 restores segmented data $d_1$–$d_{16}$ from the two phase data $D_A$ and $D_B$. For example, when the phase data $(0, +)$ and $(\pi, +)$ are inputted, the segmented data $d_1$ is outputted as shown in FIG. 10A, and when the phase data $(0, -)$ and $(\pi, -)$ are inputted, the segmented data $d_8$ is outputted. To realize this, the matrix circuit 720 comprises an input buffer for storing the two phase data $D_A$ and $D_B$, and a matrix for converting the phase data $D_A$ and $D_B$ outputted from the input buffer into the segmented data $d_1$–$d_{16}$. Furthermore, the output of the matrix circuit 720 is connected to an output buffer 730 and a decision circuit 740. The decision circuit 740 detects the table switching data $d_{x1}$ or $d_{x2}$ in the output of the matrix circuit 720, and inhibits the output of $d_{x1}$ or $d_{x2}$ stored in the output buffer 730 if the data is detected. On the other hand, when the output of the matrix circuit 720 is the segmented data $d_1$–$d_{16}$, the decision circuit 740 allows the output buffer 730 to output the segmented data stored therein. Thus, the 4-bit segmented data is obtained from a pair of the phase data $D_A$ and $D_B$.

The major portion of demodulating circuit operates as described above. The clock used by the demodulation is retrieved as follows: First, the data $\phi_k$ outputted from the low-pass filter 606 is inputted to a clock extraction circuit 70. The clock extraction circuit 70 picks up the clock from the input $\phi_k$ using a PLL circuit. This clock corresponds to the data $\phi_k$ when the alternating signal "101010101" is received. The frequency f of the clock outputted from the clock extraction circuit 70 is doubled to 2f by a doubler circuit 72, and is supplied to an averaging circuit 74 and a differentiating circuit 608 to activate the differentiating operation.

The averaging circuit 74 outputs the average value of 2f. The output of the averaging circuit 74 is supplied to the matrix circuit 720, and thus determines the conversion speed of the matrix circuit. This corresponds to the averaging process at the transmitting side.

Figure 2:
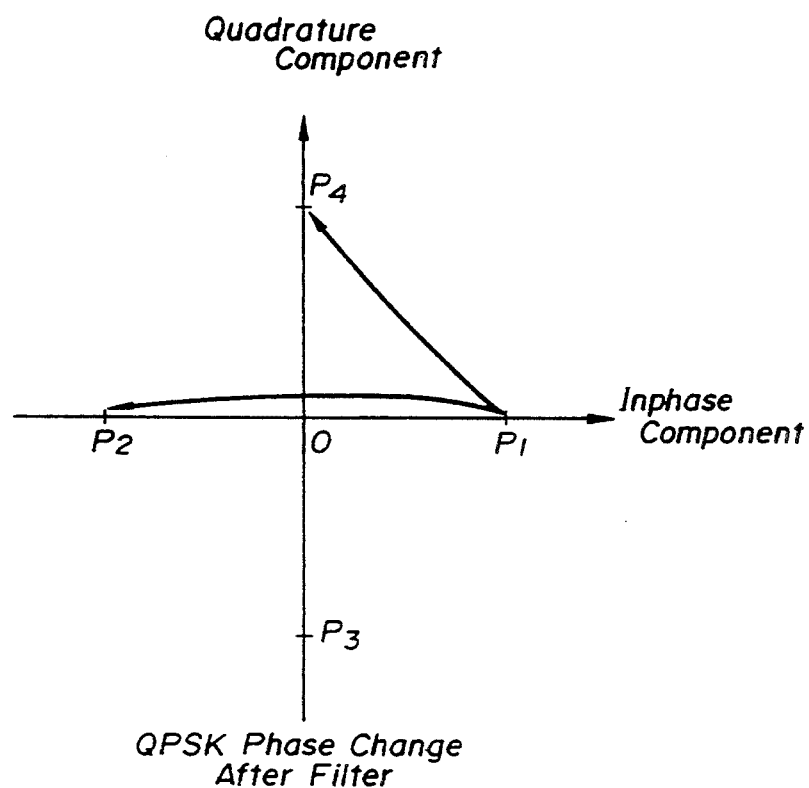
FIG. 2 is a schematic diagram illustrating phase changes in the modulator of FIG. 1.
Figure 3:
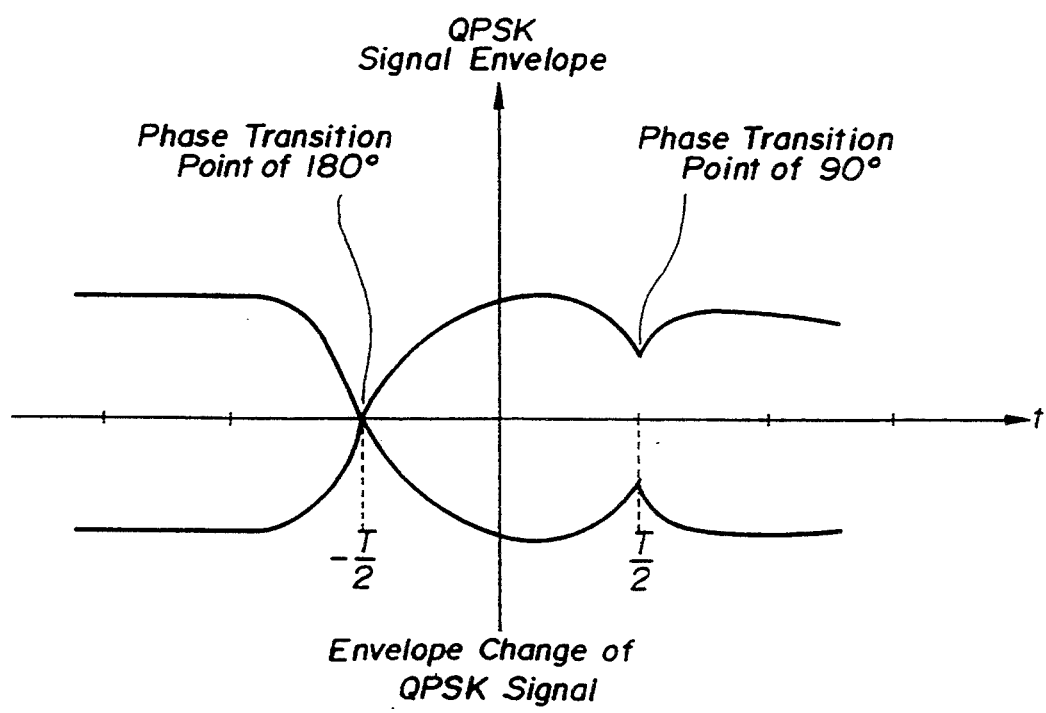
FIG. 3 is a diagram illustrating changes in an envelope occurring during the phase changes of FIG. 2.
Figure 4:
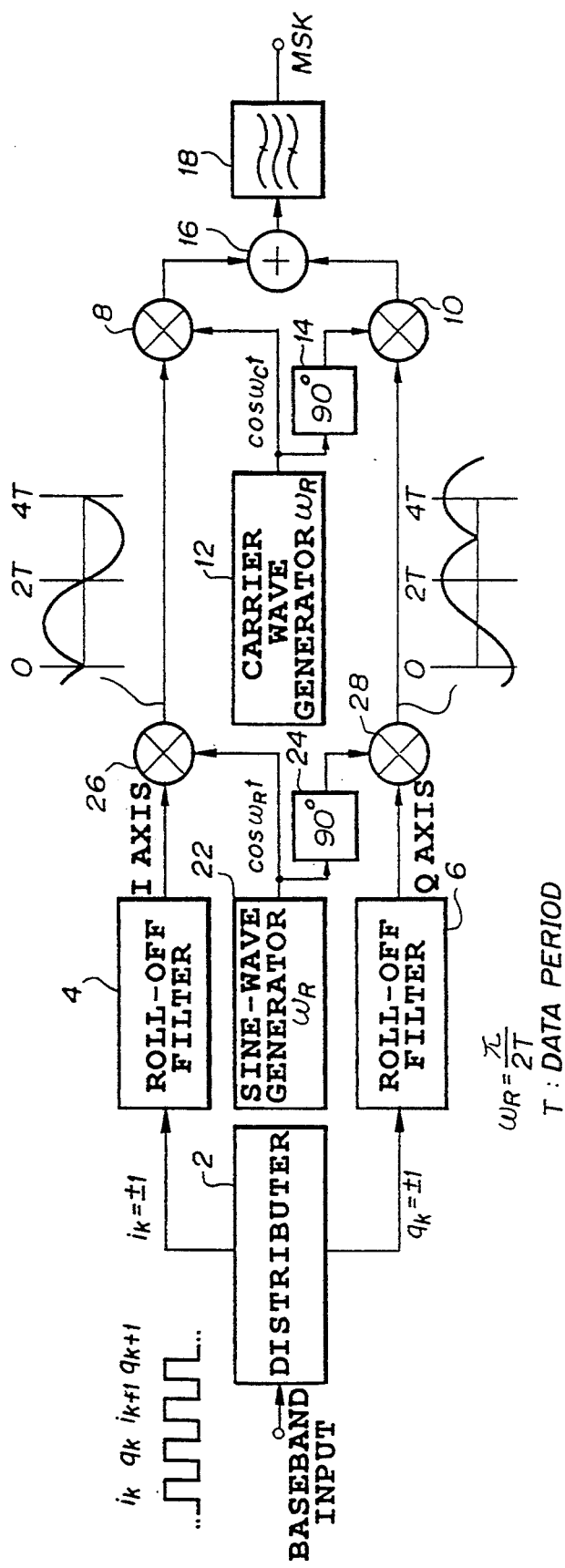
FIG. 4 is a block diagram showing the arrangement of a conventional MSK modulator.

Next, the transmission speed of the first embodiment will be studied in comparison with that of the conventional BPSK. Here, transmission data is supposed to be "10101010". In BPSK, the phase switching is performed between the points $P_1$ and $P_2$ in the phase space of FIG. 2. Accordingly, the shift distance involved in the phase switching is 2r, where r is the distance between the origin O and the point $P_1$. Since the conventional BPSK transmits 1-bit data by one action, the shift distance in the phase space per bit is 2r/bit.

In contrast, since the present embodiment carries out the phase switching by drawing a semicircle as shown in FIG. 10A and 10B, the shift distance per action is $\pi r$, and 4-bit data is transmitted per two actions. Therefore, the shift distance per bit is $2\pi r/4 = \pi r/2$. The ratio of transmission speeds can be expressed as a reciprocal of the ratio of distances per bit in the phase space. Consequently, assuming that the shift speed in the phase space is identical, the ratio of transmission speed of the conventional BPSK and that of the modified BPSK of the present embodiment is $4/\pi = 1.273$. In other words, the modified BPSK of this embodiment can improve the transmission speed by approximately 27% over the conventional BPSK.

Considering in a similar manner, the ratio of the transmission speed of the phase locus of an isosceles triangle whose base is 2r and height is r, and that of the conventional BPSK, is approximately 1.4. In the case where the isosceles triangle has the base of 2r and the height of r/2, the ratio of transmission speeds is approximately 1.8.

Furthermore, when the phase locus is an ellipse, the ratio of transmission speeds is determined as follows:

First, the elliptic locus passing through coordinates (r, 0) and (−r, 0) is approximated by a circular segment which has a radius of R and a central angle of $2\theta$. The length of the circular segment is expressed as $2R\sin^{-1}(r/R)$ because it equals $2R\theta$, and $\theta = \sin^{-1}(r/R)$. When R=r, for example, the circular segment becomes a semicircle whose arc length is $2r\sin^{-1}1 = 2r\pi/2 = \pi r$, which corresponds to the semicircle case described above. On the other hand, when R=2r, the arc length is $4r\sin^{-1}(\frac{1}{2}) = 4r(\pi/6) = (\frac{2}{3})\pi r$. Accordingly, the transmission ratio of $2r/(\frac{1}{3})\pi r = 6/\pi = 1.91$ is obtained in a way similar to that described above.

EMBODIMENT 2

In the first embodiment, the input data is divided into segments every four bits, and each 4-bit data is transmitted by two bits. To achieve this, the table switching is needed. In the second embodiment, the input segments data is divided into every three bits in order to transmit the data without the table switching. In this case, eight kinds of segmented data are produced, and one segmented data is transmitted by sending the ternary rotation direction information $q_k$ twice. This embodiment uses this rule.

Figure 12:
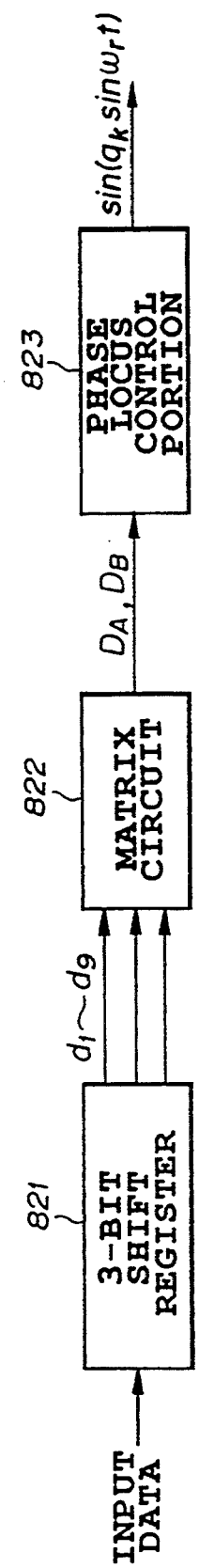
FIG. 12 is a block diagram showing the arrangement of a major portion of a second embodiment of the transmitting apparatus based on the phase modulation method in accordance with the present invention.

FIG. 12 is a block diagram showing the major portion of the second embodiment of a transmitting apparatus in accordance with the present invention. The input data is entered into a 3-bit shift register 821, and is converted into 3-bit segmented data $d_1$–$d_9$. For example, $d_1$=000, $d_2$=001, $d_3$=010, $d_4$=011, $d_5$=don't care, $d_6$=100, $d_7$=101, $d_8$=110 and $d_9$=111.

These segmented data are supplied to a matrix circuit 822. The matrix circuit 822 converts the segmented data $d_1$–$d_9$ into two phase data $D_A$ and $D_B$ in accordance with the table shown in FIG. 13. Comparing this with the first embodiment, the phase data $D_A$ and $D_B$ take a form of $(\phi_k, q_k)$=(don't care, $q_k$). In other words, since this embodiment considers only the phase rotation direction and ignores the phase rotation starting position, only the rotation direction information $q_k$ takes three values of +, 0 and −. Thus, the phase position after the completion of the phase rotation is not taken into account. For example, the phase rotation whose direction is "+" may have the phase rotation starting positions of 0 and $\pi$, wherein the phase may shift from 0 to $\pi$, or from $\pi$ to 0. By the conversion, the segmented data $d_1$ is converted into (+, +), and $d_2$ is converted into (0, +).

The phase data $D_A$ and $D_B$ are supplied to a phases locus control portion 823 that has an arrangement similar to the phase locus control portion 200 of FIG. 6. The phase locus control portion 823 outputs the phase locus control signal represented by expression (3).

The process thereafter is the same as that of the first embodiment except that the phase rotation starting position $\phi_k$ is disregarded. Thus, the description thereof is omitted here.

According to this embodiment, the 3-bit serial input data $d_1$–$d_9$ is converted into two bits on the transmission line. Since the phase locus is a semicircular arc in this embodiment, the transmission ratio reduces to 0.96 (or $3/\pi$) of that of the conventional apparatus. However, employing the phase locus of isosceles triangle with the base of 2r and the height of r/2 makes it possible to increase the transmission ratio to 1.34 times that of the conventional apparatus. Furthermore, the transmission ratio will be 1.43 times that of the conventional apparatus if the phase locus of an ellipse described above is used.

With regard to the phase data $D_A$ and $D_B$, although a pair of ternary signals are used for each of the phase data to generate the digital signal, a three-level analog signal may be used to represent the three values +, 0 and −. In either case, it is required for the phase data to control the direction of the phase rotation in the BPSK phase modulation circuit at the post stage, and the signal form whether the phase data is digital or analog has nothing to do with the subject matter of the present embodiment.

EMBODIMENT 3

Although the phase rotation direction information $q_k$ of three values (+, 0, −) is used in the first embodiment, a rotation magnitude can be incorporated into the rotation direction information $q_k$. Specifically, the phase rotation magnitude $\theta_k = p_k \omega_r$ can be incorporated into the positive and negative rotation directions as shown in FIG. 14. The basic operation of this embodiment is substantially the same as that of the first embodiment as shown in FIG. 5 except that it uses $q_k p_k \omega_r$ (=$q_k \theta_k$) instead of $q_k$. Considering this, the operation particular to this embodiment will be described below.

First, the serial input data is entered to the data conversion portion 100, which latches the input data every m bits (where m is an integer equal to or greater than 2). The m-bit data will form $2^m$ kinds of data. Here, an integer n that satisfies the following expression is obtained.

$$2^m \leq n^2$$

Then, the phase rotation magnitudes $\theta 1, \theta 2, \ldots, \theta n$ as shown in FIG. 14 are set in advance. Here, the phase rotation magnitudes $\theta 1, \theta 2, \ldots, \theta n$ shown in FIG. 14 are shown only with regard to one of the positive and negative phase rotation. It is not essential to set the phase rotation magnitudes as $(360°/n) \times 1$, $(360°/n) \times 2$, $\ldots, (360°/n) \times n$, and they can be set rather arbitrary.

The data conversion circuit 100 (shown in FIG. 5) supplies the first phase data $D_A$ and the second phase data $D_B$ to the phase locus control portion 200 in order to identify the $n^2$ data $d_{11}$–$d_{nn}$. The phase data $D_A$ and $D_B$ of this embodiment differ from those of the first embodiment which specify only the direction of the phase rotation in that they specify the rotation magnitudes $\theta 1$–$\theta n$ in addition to the rotation direction.

Thus, each of the m-bit serial data is transmitted in terms of two modulating actions of the modulator. Accordingly, when the elliptic phase locus described above is employed, the transmission speed is $(3/\pi)2^{m-1} \approx 2^{m-1}$ times that of the conventional BPSK, and when the phase locus of a semicircular arc is used, it increases to $2^m/\pi$ times.

At the receiving side, the signal received through the transmission line 400 is demodulated by the phase detector 500 and the phase locus demodulation portion 600. This gives the phase rotation magnitudes $\theta 1$–$\theta n$ contained in the phase data $D_A$, and $\theta 1$–$\theta n$ contained in the phase data $D_B$. In accordance with the these data, the data decoding portion 700 determines which one of the segmented data $d_{11}$–$d_{nn}$ has been received. Thus, m-bit serial data are demodulated.

EMBODIMENT 4

FIG. 15 shows data structure used by the fourth embodiment. This embodiment also employs hardware having substantially the same construction as that of the first embodiment, and hence the description thereof is omitted.

This embodiment differs from the first embodiment in that the first and second phase data $D_A$ and $D_B$ of this embodiment are defined by the combination of (1) n phase rotation magnitudes $\theta 1$–$\theta n$, and (2) n rotation starting phases $\phi_1$–$\phi_n$.

The remaining parts are the same as those of the first embodiment.

EMBODIMENT 5

Figure 16:
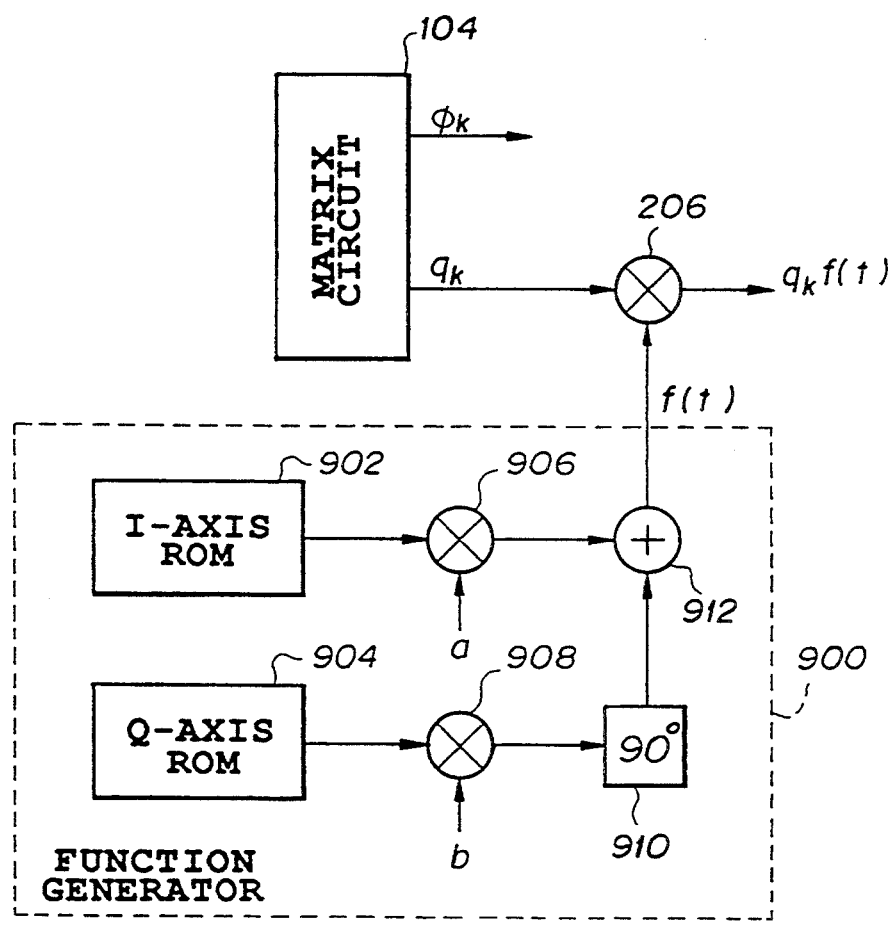
FIG. 16 is a block diagram showing the arrangement of a function generator for producing a phase locus in the form of a circle, ellipse or polygon.

FIG. 16 is a block diagram showing the major portion of the fifth embodiment. The function f(t) of this embodiment is generalized from the sine wave $\sin \omega_r t$ supplied to the multiplier 206 in FIG. 6. This allows the phase rotation locus to be not only circular, but also elliptic or triangular.

In FIG. 16, a function generator 900 generates the function f(t), and supplies it to the multiplier 206. The function generator comprises an I-axis ROM 902 that generates an I-axis signal, a Q-axis ROM 904 that generates a Q-axis signal, a multiplier 906 that multiplies the I-axis signal by a coefficient a, a multiplier 908 that multiplies the Q-axis signal by a coefficient b, a phase shifter 910 that rotates the phase of the output of the multiplier 908 by 90 degrees, and an adder 912 that adds the output of the phase shifter 910 to the output of the multiplier 906.

A various types of function f(t) can be generated by appropriately setting the coefficients a and b. For example, by setting the I-axis signal as $\cos\omega_r t$, the Q-axis signal as $\sin\omega_r t$, and $a=b=1$, the following expression is obtained.

$$\cos\omega_r t + j\sin\omega_r t \quad (a=b=1) \tag{8}$$

In this case, the phase rotation locus is a circle. When $a=1$, $b<a$, the phase rotation locus is elliptic as represented by the following expression.

$$\cos\omega_r t + jb\sin\omega_r t \quad (a=1, b<a) \tag{9}$$

According to this embodiment, various phase loci, such as a circle, ellipse, triangle, line, and the like, can be generated. A plurality of phase loci can be assigned to form the segmented data system, so that the signal transmission is carried out by these plurality of phase loci.

INDUSTRIAL APPLICABILITY

The transmitting apparatus and the receiving apparatus based on the phase modulation method in accordance with the present invention can be widely applied to the communications field such as television, telephone, personal computer communications, and the like.

We claim:

1. A transmitting apparatus based on phase modulation, comprising:
    data conversion means for dividing input data to be transmitted into every predetermined number of bits, for sequentially outputting the predetermined number of bits as segmented data, and generating ternary phase rotation information associated therewith;
    phase locus control means for outputting a phase locus control signal that represents each of said segmented data by using the ternary phase rotation information generated by said data conversion means corresponding to a positive direction, a negative direction and a non-rotation state of phase rotation directions; and
    modulation means for modulating the phase of a carrier signal with the phase locus control signal, thereby obtaining a transmission signal.

2. A transmitting apparatus based on phase modulation as claimed in claim 1, wherein said phase locus control means outputs the phase locus control signal representing said segmented data by said ternary phase rotation information associated with the direction of the phase rotation, and by a phase at which said phase rotation starts.

3. A transmitting apparatus based on phase modulation as claimed in claim 1, wherein said phase locus control means outputs the phase locus control signal representing said segmented data by said ternary phase rotation information associated with the direction of the phase rotation, and by a phase rotation amount of said phase rotation.

4. A transmitting apparatus based on phase modulation as claimed in claim 3, wherein said phase rotation amount takes a plurality of values.

5. A transmitting apparatus based on phase modulation as claimed in claim 1, wherein said phase locus control means outputs the phase locus control signal representing said segmented data by said ternary phase rotation information associated with the direction of the phase rotation, by a phase at which said phase rotation starts, and by a phase rotation amount of said phase rotation.

6. A transmitting apparatus based on phase modulation as claimed in claim 1, wherein said phase locus control means controls said phase rotation so that the locus of said phase rotation draws at least one of the loci of a circle, an ellipse, a polygon, and a line.

7. A transmitting apparatus based on phase modulation as claimed in claim 6, wherein said phase locus control means represents the phase locus control signal by difference of the locus of said phase rotation.

8. A transmitting apparatus based on phase modulation as claimed in claim 2, further comprising:
    means for dividing said segmented data into groups so that continuous phase control is possible in each of said groups in the case where one or more starting positions of said phase rotation cause continuous phase control impossible because of discontinuity of said starting positions;
    means for storing tables prepared for each of said groups to cross-refer between said segmented data in that group and said phase locus control signal; and
    means for supplying table switching data instructing switching between said tables.

9. A transmitting apparatus based on phase modulation as claimed in claim 8, further comprising averaging means for determining an average of intervals of a clock that controls said segmented data and said table switching data supplied by said means for supplying, wherein said conversion from said segmented data into said phase locus control signal is controlled by the averaged interval of the clock outputted from said averaging means.

10. A receiving apparatus based on phase modulation, which receives a phase modulation signal formed by changing the phase of a signal in accordance with a phase locus control signal which is formed by dividing input data to be transmitted into segmented data of a predetermined number of bits, and by representing each of said segmented data sequentially by ternary phase rotation information which corresponds to a positive direction, a negative direction and a non-rotation state of phase rotation directions, said receiving apparatus comprising:
    a phase detector detecting said phase modulation signal;
    phase locus demodulation means for demodulating said phase locus control signal from an output of said phase detector; and
    decoding means for decoding said phase rotation signal into said segmented data in response to the phase locus demodulation means.

11. A receiving apparatus based on phase modulation as claimed in claim 10, wherein said phase locus control signal represents said segmented data by said ternary phase rotation information associated with the direction of the phase rotation, and by a phase at which said phase rotation starts, and said phase locus demodulation means demodulates said phase locus control signal.

12. A receiving apparatus based on phase modulation as claimed in claim 10, wherein said phase locus control signal represents said segmented data by said ternary phase rotation information associated with the direction of the phase rotation, and by a phase rotation amount of said phase rotation, and said phase locus demodulation means demodulates said phase locus control signal.

13. A receiving apparatus based on phase modulation as claimed in claim 12, wherein said phase rotation amount takes a plurality of values.

14. A receiving apparatus based on phase modulation as claimed in claim 10, wherein said phase locus control signal represents said segmented data by said ternary phase rotation information associated with the direction of the phase rotation, by a phase at which said phase rotation starts, and by a phase rotation amount of said phase rotation, and said phase locus demodulation means demodulates said phase locus control signal.

15. A receiving apparatus based on phase modulation as claimed in claim 10, wherein said phase locus control signal is controlled such that the locus of said phase rotation draws at least one of the loci of a circle, an ellipse, a polygon, and a line, and said phase locus demodulation means demodulates said phase locus control signal.

16. A receiving apparatus based on phase modulation as claimed in claim 15, wherein said phase locus demodulation means demodulates said phase locus control signal by difference of the locus of said phase rotation.

17. A receiving apparatus based on phase modulation as claimed in claim 11, wherein said phase locus demodulation means demodulates table switching data when said table switching data has been transmitted, said table switching data instructing switching of reference tables that cross-refer between said phase locus control signal and segmented data which are divided into data groups in which continuous phase control is possible.

18. A receiving apparatus based on phase modulation as claimed in claim 17, further comprising averaging means for determining an average of intervals of clock that controls said segmented data and said table switching data, wherein said conversion from said phase locus control signal into said segmented data is controlled by the averaged interval of the clock outputted form said averaging means.

19. A transmitting and receiving apparatus based on phase modulation, comprising:
   data conversion means for dividing input data to be transmitted into every predetermined number of bits, and for sequentially outputting the predetermined number of bits as segmented data, and generating ternary phase rotation information associated therewith;
   phase locus control means for outputting a phase locus control signal that represents each of said segmented data by using the ternary phase rotation information generated by said data conversion means corresponding to a positive direction, a negative direction and a non-rotation state of phase rotation directions;
   modulation means for modulating the phase of a carrier signal with the phase locus control signal, thereby obtaining a transmission signal;
   a phase detector detecting said transmission signal;
   phase locus demodulation means for demodulating said phase locus control signal from an output of said phase detector; and
   decoding means for decoding said phase rotation signal into said segmented data in response to the phase locus demodulation means.

20. A transmitting and receiving apparatus based on phase modulation as claimed in claim 19, wherein said phase locus control means forms the phase locus control signal representing said segmented data by said ternary phase rotation information associated with the direction of the phase rotation, and by a phase at which said phase rotation starts, and said phase locus demodulation means demodulates said phase locus control signal.

* * * * *